(12) United States Patent
Griffiths et al.

(10) Patent No.: US 8,524,344 B1
(45) Date of Patent: Sep. 3, 2013

(54) POLYMERIC VESSEL

(71) Applicant: GM Global Technology Operations LLC, Detroit, MI (US)

(72) Inventors: Leonard Barry Griffiths, Fenton, MI (US); Michael A. Karram, Flint, MI (US); Xin Ouyang, Madison Heights, MI (US)

(73) Assignee: GM Global Technology Operations PLLC, Detroit, MI (US)

( * ) Notice: Subject to any disclaimer, the term of this patent is extended or adjusted under 35 U.S.C. 154(b) by 0 days.

(21) Appl. No.: 13/670,893

(22) Filed: Nov. 7, 2012

(51) Int. Cl.
*B29D 22/00* (2006.01)

(52) U.S. Cl.
USPC ............... 428/35.7; 123/184.21; 220/4.13; 220/4.14

(58) Field of Classification Search
USPC ........... 428/35.7; 123/184.21; 220/4.13, 220/4.14; 156/73.5, 73.1
See application file for complete search history.

(56) References Cited

U.S. PATENT DOCUMENTS

| | | | | |
|---|---|---|---|---|
| 3,604,581 | A | * | 9/1971 | Van Iperen ................... 215/207 |
| 3,701,708 | A | * | 10/1972 | Brown et al. ................. 156/582 |
| 4,811,760 | A | * | 3/1989 | Van Kirk et al. .............. 138/115 |
| 6,679,215 | B2 | * | 1/2004 | Benson et al. ........... 123/184.34 |
| 7,000,576 | B2 | * | 2/2006 | Olson ......................... 123/41.51 |
| 7,451,732 | B1 | * | 11/2008 | Vichinsky et al. ....... 123/184.47 |
| 7,726,342 | B2 | * | 6/2010 | Campbell et al. ............. 137/861 |
| 2003/0101957 | A1 | * | 6/2003 | Benson et al. ........... 123/184.34 |
| 2004/0069352 | A1 | * | 4/2004 | Wieland et al. ............... 137/539 |
| 2009/0308865 | A1 | * | 12/2009 | Auer et al. ................... 220/4.13 |
| 2012/0103295 | A1 | * | 5/2012 | Owen ...................... 123/184.21 |

* cited by examiner

*Primary Examiner* — N. Edwards
(74) *Attorney, Agent, or Firm* — Quinn Law Group, PLLC

(57) ABSTRACT

A polymeric vessel includes a first shell formed from a thermoplastic polymer and including a weld stub, and a second shell formed from the thermoplastic polymer and including a weld anvil matable with the weld stub. The polymeric vessel also includes a friction weld joint joining the weld stub and the weld anvil, and a coupling element interconnecting the first shell and the second shell and spaced apart from the friction weld joint.

19 Claims, 3 Drawing Sheets

POLYMERIC VESSEL

TECHNICAL FIELD

The disclosure relates to polymeric vessels.

BACKGROUND

Polymeric vessels may include a first shell welded to a second shell. One type of polymeric vessel, an air intake manifold for an internal combustion engine, evenly distributes an air/fuel mixture to the internal combustion engine. In particular, after air and fuel are combined within a fuel-injection system of a vehicle, the air/fuel mixture may flow into the air intake manifold for subsequent delivery to each cylinder of the internal combustion engine.

SUMMARY

A polymeric vessel includes a first shell formed from a thermoplastic polymer and including a weld stub, and a second shell formed from the thermoplastic polymer and including a weld anvil matable with the weld stub. The polymeric vessel also includes a friction weld joint joining the weld stub and the weld anvil, and a coupling element interconnecting the first shell and the second shell and spaced apart from the friction weld joint.

In one embodiment, the first shell has a first arm spaced apart from the weld stub, and the first arm defines a first outer surface. The second shell has a second arm spaced apart from the weld anvil, and the second arm defines a second outer surface. Further, the polymeric vessel includes a plurality of friction weld joints each spaced apart from one another along the weld stub. The plurality of friction weld joints join the weld stub and the weld anvil. In addition, the polymeric vessel includes a coupling element interconnecting the first shell and the second shell and spaced apart from the plurality of friction weld joints. The coupling element includes a spring attached to and disposed between the first arm and the second arm, and a strap welded to and interconnecting the first outer surface and the second outer surface.

In another embodiment, the first shell is formed from a polyamide and includes a weld stub spaced apart from the first arm. The weld stub has a first width of from about 3 mm to about 5 mm. The second shell is also formed from the polyamide and includes a weld anvil spaced apart from the second arm that is matable with the weld stub. The weld anvil has a second width that is greater than the first width. For this embodiment, the second width is from about 5 mm to about 7 mm. The polymeric vessel also includes a friction weld joint joining the weld stub and the weld anvil and extending along an entirety of the first width. Further, the polymeric vessel includes a coupling element interconnecting the first shell and the second shell and spaced apart from the friction weld joint, wherein the coupling element includes a spring attached to and disposed between the first arm and the second arm.

The detailed description and the drawings or Figures are supportive and descriptive of the disclosure, but the scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Figure 1:
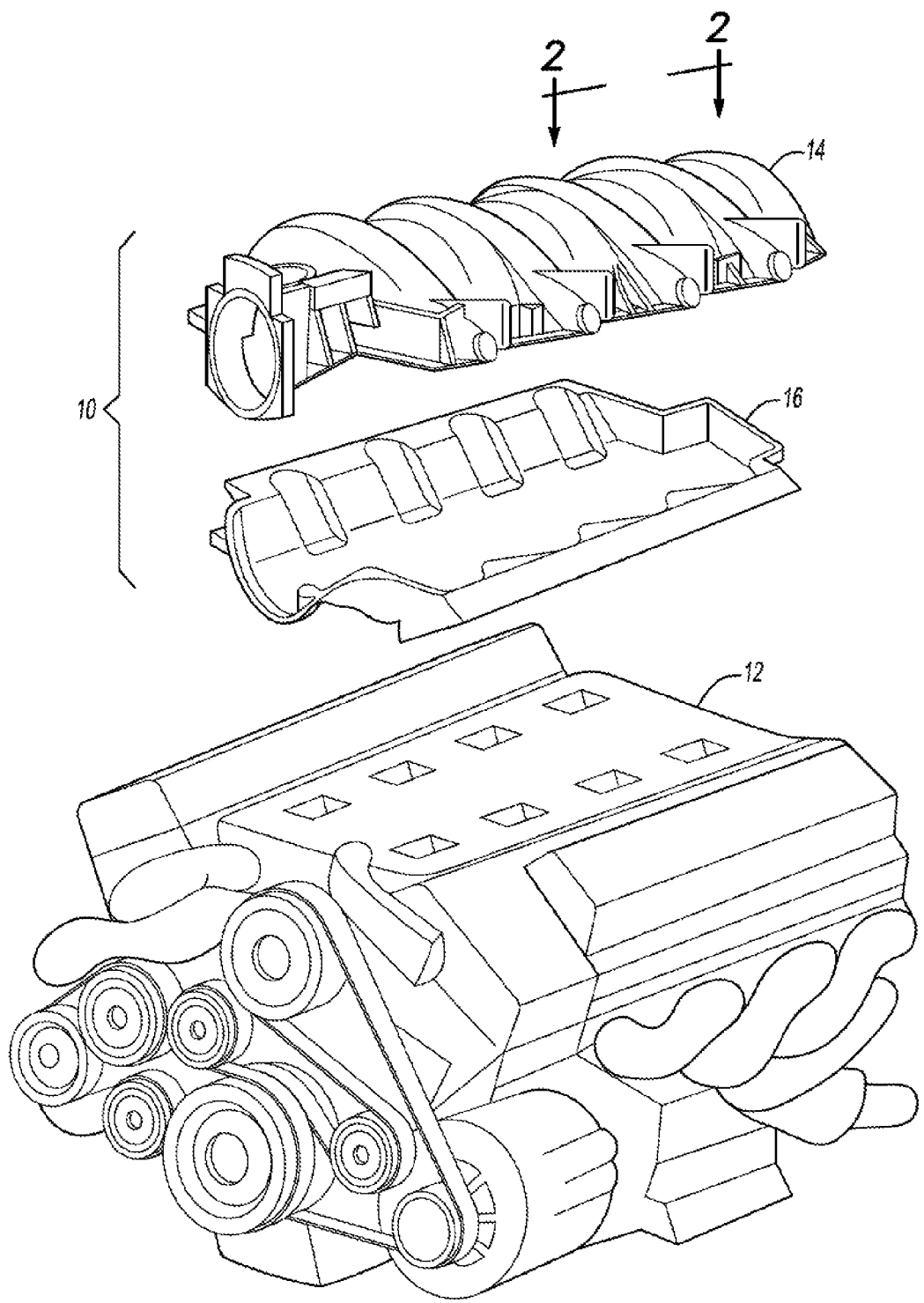
FIG. 1 is a schematic perspective exploded illustration of a polymeric vessel, wherein the polymeric vessel includes a first shell and a second shell.

Referring to the Figures, wherein like reference numerals refer to like elements, a polymeric vessel 10 is shown generally in FIG. 1. As a non-limiting example, the polymeric vessel 10 may be an air intake manifold for an internal combustion engine 12. Alternatively, the polymeric vessel 10 may be a pressure vessel, such as, but not limited to, a fuel storage tank for a vehicle. As such, the polymeric vessel 10 may be useful for vehicles, such as automotive vehicles, that require polymeric components having excellent strength during operation. However, the polymeric vessel 10 may also be useful for non-automotive applications including, for example, aviation applications.

By way of general explanation as described with reference to FIG. 1, in one non-limiting example, when assembled, the polymeric vessel 10 may be generally sealingly attached to an upper portion of the internal combustion engine 12. For example, the polymeric vessel 10 may be an air intake manifold and may be attached to the internal combustion engine 12 so as to align with individual cylinders (not shown) of the internal combustion engine 12. Further, a gasket (not shown) may be disposed between the polymeric vessel 10 and the internal combustion engine 12 to ensure an air-tight seal between each cylinder and the polymeric vessel 10.

With continued reference to FIG. 1, the polymeric vessel 10 includes a first shell 14 formed from a thermoplastic polymer and a second shell 16 formed from the thermoplastic polymer. That is, the polymeric vessel 10 is not formed from, for example, a metal such as aluminum. As used herein, the terminology "thermoplastic polymer" refers to a non-thermosetting polymer that generally exhibits pliability or moldability above a specific temperature, and reversibly exhibits a hardened state below the specific temperature. That is, the thermoplastic polymer is remoldable. Suitable thermoplastic polymers include, but are not limited to, acrylonitrile butadiene styrenes, polyacrylates, polyacrylonitriles, polyamides, polyamide-imide, polybutadienes, polycarbonates, polyethylene terephthalate, polyethylenes, polyketones, polypropylenes, polyurethanes, and combinations thereof. In one non-limiting example, the thermoplastic polymer is a polyamide. In particular, the thermoplastic polymer may be an aliphatic polyamide such as nylon 6 or nylon 6,6.

Figure 2:
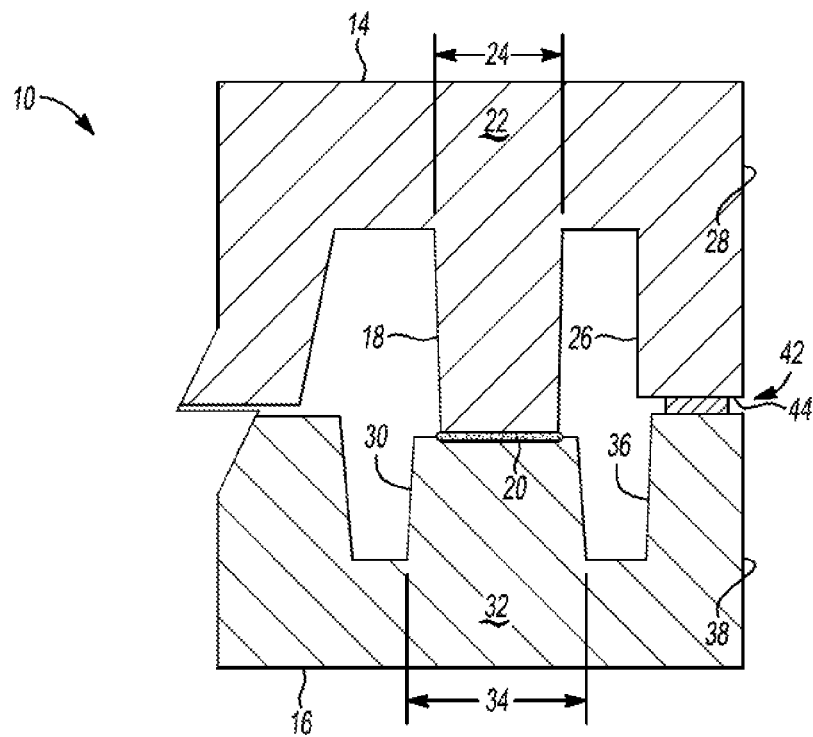
FIG. 2 is a schematic illustration of a cross-sectional partial view of the polymeric vessel of FIG. 1 taken along section lines 2-2, wherein the first shell is joined to the second shell by a friction weld joint and a coupling element.

Referring now to FIG. 2, the first shell 14 includes a weld stub 18 configured for joining to another component via a friction weld joint 20. The first shell 14 may be referred to as an upper half or portion of the polymeric vessel 10, and may be disposed farthest from the internal combustion engine 12 (FIG. 1) when the polymeric vessel 10 is attached to the internal combustion engine 12. Further, the weld stub 18 may be referred to as a tongue. As best shown in FIG. 2, the weld stub 18 may extend from a body 22 of the first shell 14 towards the internal combustion engine 12 when the polymeric vessel 10 is installed onto the internal combustion engine 12. The weld stub 18 may have a first width 24 of from about 2 mm to about 6 mm. For example, the first width 24 may be from about 3 mm to about 5 mm. In one non-limiting example, the first width 24 may be about 4 mm.

In addition, as best shown in FIG. 2, the first shell 14 may have a first arm 26 or flange extension spaced apart from the weld stub 18 and defining a first outer surface 28. That is, the first arm 26 may also extend from the body 22 towards the internal combustion engine 12 (FIG. 1) when the polymeric vessel 10 is attached to the internal combustion engine 12, but may be spaced apart from the weld stub 18. Stated differently, the first arm 26 may not be integral with the weld stub 18. Moreover, the first outer surface 28 may correspond to an exterior surface of the polymeric vessel 10.

With continued reference to FIG. 2, the polymeric vessel 10 further includes the second shell 16. The second shell 16 may be referred to as a lower half or portion of the polymeric vessel 10, and may be disposed closest to the internal combustion engine 12 (FIG. 1) when the polymeric vessel 10 is attached to the internal combustion engine 12. The second shell 16 may mate to the first shell 14 to define a cavity (not shown) therebetween configured for transmitting an air/fuel mixture to the internal combustion engine 12. More specifically, the second shell 16 includes a weld 30 matable with the weld stub 18. The weld anvil 30 may be referred to as a tongue. The weld anvil 30 may be configured for joining to the weld stub 18 via the friction weld joint 20, as set forth in more detail below. Such joining may be referred to as a double tongue design by welding machine manufacturers.

As best shown in FIG. 2, the weld anvil 30 may extend from a core 32 of the second shell 16 away from the internal combustion engine 12 (FIG. 1) when the polymeric vessel 10 is installed onto the internal combustion engine 12. The weld anvil 30 may have a second width 34 that is greater than the first width 24. More specifically, the second width 34 may be from about 4 mm to about 8 mm. For example, the second width 34 may be from about 5 mm to about 7 mm. In one non-limiting example, the second width 34 may be about 6 mm.

In addition, as best shown in FIG. 2, the second shell 16 may have a second arm 36 or flange extension spaced apart from the weld anvil 30 and defining a second outer surface 38. That is, the second arm 36 may also extend from the core 32 away from the internal combustion engine 12 (FIG. 1) when the polymeric vessel 10 is attached to the internal combustion engine 12, but may be spaced apart from the weld anvil 30. Stated differently, the second arm 36 may not be integral with the weld anvil 30. Moreover, the second outer surface 38 may correspond to an exterior surface of the polymeric vessel 10.

Referring again to FIG. 2, the polymeric vessel 10 also includes the friction weld joint 20 joining the weld stub 18 and the weld anvil 30. The friction weld joint 20 may be formed by a friction welding process in which heat is generated through mechanical friction between a moving workpiece and a stationary component such that a lateral force plastically displaces and fuses together two components, e.g., the weld stub 18 and the weld anvil 30. That is, the thermoplastic polymer of the weld stub 18 and the weld anvil 30 may fuse together such that introduction of additional weld material to form the weld joint 20 is not necessary. As such, the friction weld joint 20 may have a comparatively small heat affected zone as compared to, for example, a comparative joint (not shown) formed via melting material and/or augmenting the comparative joint with a filler material.

The friction weld joint 20 may be formed via linear vibration welding in which the weld stub 18 and the weld anvil 30 are placed in contact under applied pressure while an external vibration force is applied to translate the weld stub 18 and the weld anvil 30 relative to one another in a direction perpendicular to the direction of the applied pressure. Similarly, the friction weld joint 20 may be formed via angular friction welding in which the weld stub 18 and the weld anvil 30 are placed in contact under applied pressure while an external vibration force is applied to torque the weld stub 18 and the weld anvil 30 relative to one another at an angle. Alternatively, the friction weld joint 20 may be formed via orbital friction welding in which the weld stub 18 and the weld anvil 30 rotate with respect to one another.

Figure 3:
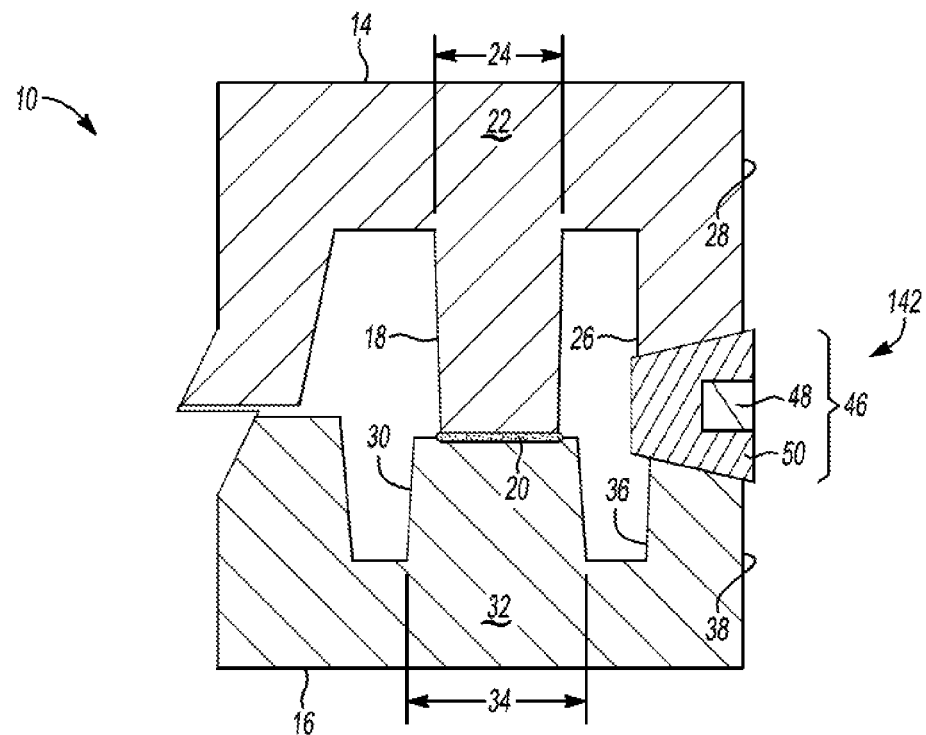
FIG. 3 is a schematic illustration of a cross-sectional partial view of another embodiment of the coupling element of FIG. 2.
Figure 4:
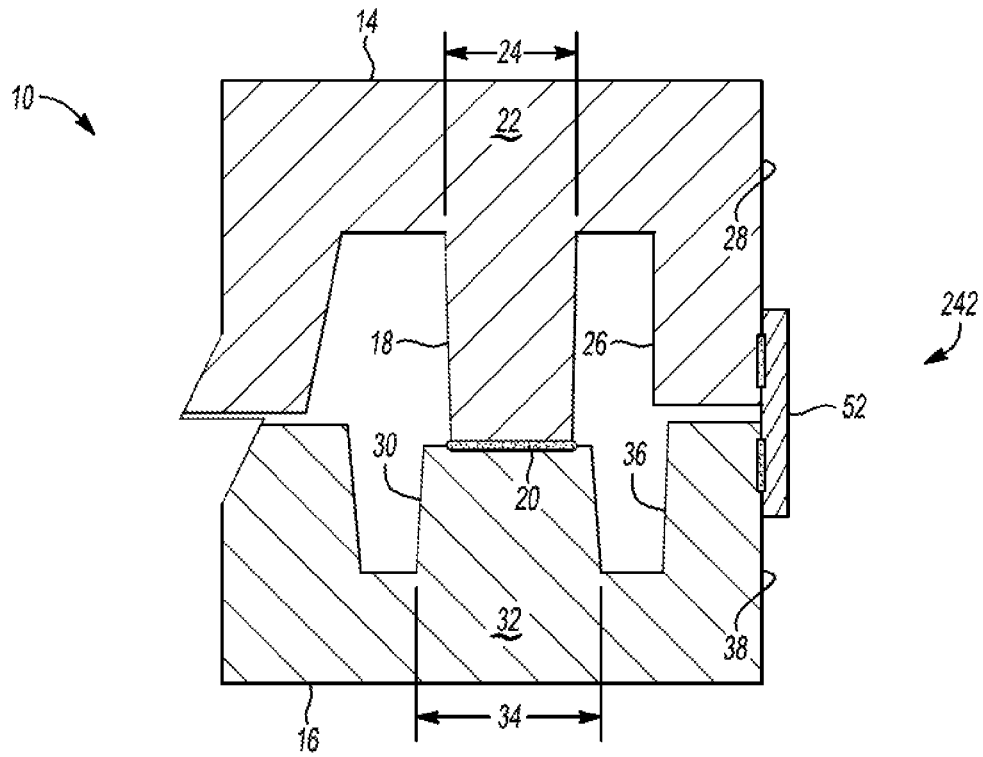
FIG. 4 is a schematic illustration of a cross-sectional partial view of a further embodiment of the coupling element of FIG. 2.

Referring now to FIGS. 2-4, the friction weld joint 20 may extend along an entirety of the first width 24. Conversely, the friction weld joint 20 may not extend along an entirety of the second width 34. That is, since the second width 34 may be greater than the first width 24 as set forth above, the friction weld joint 20 may extend along the entire first width 24, and may not extend along the entire second width 34.

Figure 5:
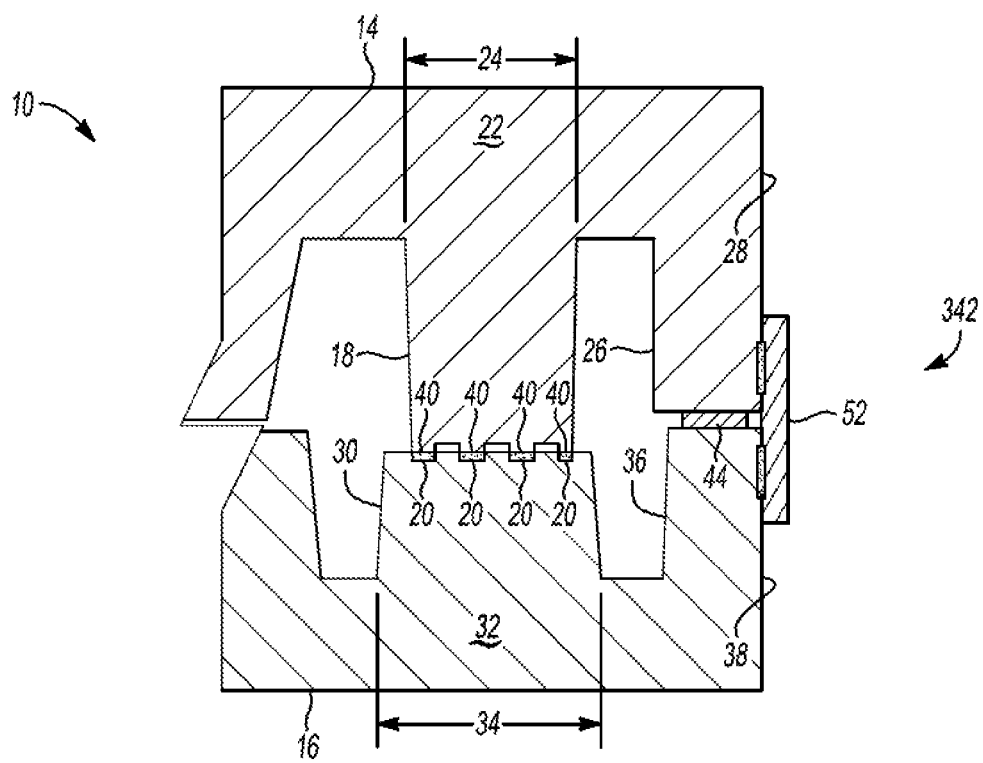
FIG. 5 is a schematic illustration of a cross-sectional partial view of an additional embodiment of the coupling element of FIG. 2.

Referring now to FIG. 5, the polymeric vessel 10 may further include a plurality of friction weld joints 20 each spaced apart from one another along the weld stub 18, and joining the weld stub 18 and the weld anvil 30. More specifically, for this embodiment, the weld stub 18 may include a plurality of protrusions 40 extending therefrom towards the weld anvil 30, and each of the plurality of friction weld joints 20 may join a respective one of the plurality of protrusions 40 to the weld anvil 30. That is, the weld stub 18 may be corrugated, and each of the plurality of friction weld joints 20 may be formed on one of the plurality of protrusions 40 to thereby join the weld stub 18 to the weld anvil 30. The polymeric vessel 10 may include, for example, from three to six friction weld joints 20. In one non-limiting example, the polymeric vessel 10 may include four friction weld joints 20 and four protrusions 40.

Referring again to FIGS. 2-5, the polymeric vessel 10 also includes a coupling element 42, 142, 242, 342 interconnecting the first shell 14 and the second shell 16 and spaced apart from the friction weld joint 20. The coupling element 42, 142, 242, 342 may be configured to augment the friction weld joint 20 and attach the first shell 14 to the second shell 16. More specifically, as set forth in more detail below, the coupling element 42, 142, 242, 342 is spaced apart from the friction weld joint 20 such that the coupling element 42, 142, 242, 342 may not abut or contact the friction weld joint 20.

In one embodiment, as described with reference to FIG. 2, the coupling element 42 may include a spring 44 attached to and disposed between the first arm 26 and the second arm 36 such that the first outer surface 28 is coplanar with the second outer surface 38. For example, the spring 44 may be a leaf spring disposed between the first arm 26 and the second arm 36. Further, since the first arm 26 is spaced apart from the weld stub 18, and the second arm 36 is spaced apart from the weld anvil 30 as set forth above, the spring 44 is also spaced apart from the friction weld joint 20. The spring 44 interconnects the first arm 26 and the second arm 36 such that the first outer surface 28 is substantially flush with the second outer surface 38. As such, the spring 44 may provide reinforcement and flexibility to the connection between the first shell 14 and the second shell 16. In particular, the spring 44 may decrease a bending moment to which the friction weld joint 20 is exposed such that the weld stub 18 and the weld anvil 30 may not easily separate from one another when exposed to torque and/or force. As such, the coupling element 42 may provide the polymeric vessel 10 with excellent strength, especially in an event of momentary overpressurization within the cavity (not shown) defined by the polymeric vessel 10, so that the first shell 14 may not separate from the second shell 16. That is, the spring 44 may provide the polymeric vessel 10 and friction weld joint 20 with excellent burst strength. As used herein, the terminology "burst strength" refers to a strength of the polymeric vessel 10, e.g., a strength of the friction weld joint 20 and the thermoplastic polymer, and represents a pressure below which the first shell 14 and the second shell 16 may not separate.

Referring now to FIG. 3, in another embodiment, the coupling element 142 may include a screw component 46 attached to and disposed between the first arm 26 and the second arm 36 such that the first outer surface 28 is coplanar with the second outer surface 38. For example, the screw component 46 may be a tapered screw plug in which a screw 48 is inserted into a cavity (not shown) defined by a plug 50, wherein the plug 50 is attached and tapered with respect to both the first arm 26 and the second arm 36. For this embodiment, the screw 48 may be threadably mated to the plug 50 within the cavity such that a distance between the first arm 26 and the second arm 36 may be adjusted via the screw 48. Further, since the first arm 26 is spaced apart from the weld stub 18, and the second arm 36 is spaced apart from the weld anvil 30 as set forth above, the screw component 46 is also spaced apart from the friction weld joint 20. The screw component 46 interconnects the first arm 26 and the second arm 36 such that the first outer surface 28 is substantially flush with the second outer surface 38. As such, the screw component 46 may provide reinforcement and flexibility to the connection between the first shell 14 and the second shell 16. In particular, the screw component 46 may decrease a bending moment to which the friction weld joint 20 is exposed such that the weld stub 18 and the weld anvil 30 may not easily separate from one another when exposed to torque and/or force. As such, the screw component 46 may provide the polymeric vessel 10 with excellent strength, especially in an event of momentary overpressurization within the cavity (not shown) defined by the polymeric vessel 10, so that the first shell 14 may not separate from the second shell 16. That is, the screw component 46 may provide the polymeric vessel 10 and friction weld joint 20 with excellent burst strength.

Referring now to FIG. 4, in another embodiment, the coupling element 242 may include a strap 52 welded to and interconnecting the first outer surface 28 and the second outer surface 38 such that the first outer surface 28 is coplanar with the second outer surface 38. That is, the strap 52 may be welded to the exterior surface of the polymeric vessel 10. For example, the strap 52 may be a brace welded to the first outer surface 28 and the second outer surface 38 between the first arm 26 and the second arm 36. For this embodiment, the strap 52 may reinforce the friction weld joint 20 joining the weld stub 18 and the weld anvil 30. Further, since the first arm 26 is spaced apart from the weld stub 18 and the second arm 36 is spaced apart from the weld anvil 30 as set forth above, the strap 52 is also spaced apart from the friction weld joint 20. The strap 52 interconnects the first arm 26 and the second arm 36 such that the first outer surface 28 is substantially flush with the second outer surface 38. As such, the strap 52 may provide reinforcement and flexibility to the connection between the first shell 14 and the second shell 16. In particular, the strap 52 may decrease a bending moment to which the friction weld joint 20 is exposed such that the weld stub 18 and the weld anvil 30 may not easily separate from one another when exposed to torque and/or force. As such, the strap 52 may provide the polymeric vessel 10 with excellent strength, especially in an event of momentary overpressurization within the cavity (not shown) defined by the polymeric vessel 10, so that the first shell 14 may not separate from the second shell 16. That is, the strap 52 may provide the polymeric vessel 10 and friction weld joint 20 with excellent burst strength.

Referring now to FIG. 5, in yet another embodiment, the coupling element 342 may include the spring 44 attached to and disposed between the first arm 26 and the second arm 36, and the strap 52 welded to and interconnecting the first outer surface 28 and the second outer surface 38. Further, since the first arm 26 is spaced apart from the weld stub 18, and the second arm 36 is spaced apart from the weld anvil 30 as set forth above, the spring 44 and the strap 52 are each spaced apart from the friction weld joint 20. The spring 44 and the strap 52 interconnect the first arm 26 and the second arm 36 such that the first outer surface 28 is substantially flush with the second outer surface 38. As such, the spring 44 and the strap 52 may both provide reinforcement and flexibility to the connection between the first shell 14 and the second shell 16. For this embodiment, the spring 44 and the strap 52 may reinforce the friction weld joint 20 joining the weld stub 18 and the weld anvil 30. In particular, the spring 44 and the strap 52 may together decrease a bending moment to which the friction weld joint 20 is exposed such that the weld stub 18 and the weld anvil 30 may not easily separate from one another when exposed to torque and/or force. As such, the combination of the spring 44 and the strap 52 may provide the polymeric vessel 10 with excellent strength, especially in an event of momentary overpressurization within the cavity (not shown) defined by the polymeric vessel 10, so that the first shell 14 may not separate from the second shell 16. That is, the combination of the spring 44 and the strap 52 may provide the polymeric vessel 10 and friction weld joint 20 with excellent burst strength.

Therefore, the polymeric vessel 10 exhibits excellent strength during operation. More specifically, the coupling element 42, 142, 242, 342 (FIGS. 2-5) reduces a bending moment to which the friction weld joint 20 (FIGS. 2-5) is exposed during operation, e.g., during operation of the internal combustion engine 12. As such, the friction weld joint 20 and coupling element 42, 142, 242, 342 minimize separation of the first shell 14 from the second shell 16 during operation of the polymeric vessel 10.

While the best modes for carrying out the disclosure have been described in detail, those familiar with the art to which this disclosure relates will recognize various alternative designs and embodiments for practicing the disclosure within the scope of the appended claims.

The invention claimed is:

1. A polymeric vessel comprising:
   a first shell formed from a thermoplastic polymer and including a weld stub;
   a second shell formed from the thermoplastic polymer and including a weld anvil matable with the weld stub;
   a friction weld joint joining the weld stub and the weld anvil; and
   a coupling element interconnecting the first shell and the second shell and spaced apart from the friction weld joint.

2. The polymeric vessel of claim 1, wherein the first shell has a first arm spaced apart from the weld stub and defining a first outer surface, and the second shell has a second arm spaced apart from the weld anvil and defining a second outer surface, and further wherein the coupling element includes a spring attached to and disposed between the first arm and the second arm such that the first outer surface is coplanar with the second outer surface.

3. The polymeric vessel of claim 2, further including a plurality of friction weld joints each spaced apart from one another along the weld stub and joining the weld stub and the weld anvil.

4. The polymeric vessel of claim 3, wherein the weld stub includes a plurality of protrusions extending therefrom towards the weld anvil, and further wherein each of the plurality of friction weld joints joins a respective one of the plurality of protrusions to the weld anvil.

5. The polymeric vessel of claim 4, further including from three to six friction weld joints.

6. The polymeric vessel of claim 1, wherein the first shell has a first arm spaced apart from the weld stub and defining a first outer surface, and the second shell has a second arm spaced apart from the weld anvil and defining a second outer surface, and further wherein the coupling element includes a screw component attached to and disposed between the first arm and the second arm such that the first outer surface is coplanar with the second outer surface.

7. The polymeric vessel of claim 1, wherein the first shell has a first arm spaced apart from the weld stub and defining a first outer surface, and the second shell has a second arm spaced apart from the weld anvil and defining a second outer surface, and further wherein the coupling element includes a strap welded to and interconnecting the first outer surface and the second outer surface such that the first outer surface is coplanar with the second outer surface.

8. The polymeric vessel of claim 1, wherein the weld stub has a first width of from about 2 mm to about 6 mm.

9. The polymeric vessel of claim 8, wherein the friction weld joint extends along an entirety of the first width.

10. The polymeric vessel of claim 1, wherein the weld stub has a first width and the weld anvil has a second width that is greater than the first width.

11. The polymeric vessel of claim 10, wherein the friction weld joint does not extend along an entirety of the second width.

12. The polymeric vessel of claim 10, wherein the second width is from about 4 mm to about 8 mm.

13. The polymeric vessel of claim 9, wherein the thermoplastic polymer is a polyamide.

14. A polymeric vessel comprising:
a first shell having a first arm defining a first outer surface, wherein the first shell is formed from a thermoplastic polymer and includes a weld stub spaced apart from the first arm;
a second shell having a second arm defining a second outer surface, wherein the second shell is formed from the thermoplastic polymer and includes a weld anvil matable with the weld stub and spaced apart from the second arm;
a plurality of friction weld joints each spaced apart from one another along the weld stub and joining the weld stub and the weld anvil; and
a coupling element interconnecting the first shell and the second shell and spaced apart from the plurality of friction weld joints, wherein the coupling element includes:
a spring attached to and disposed between the first arm and the second arm; and
a strap welded to and interconnecting the first outer surface and the second outer surface.

15. The polymeric vessel of claim 14, wherein the weld stub includes a plurality of protrusions extending therefrom towards the weld anvil, and further wherein each of the plurality of friction weld joints joins a respective one of the plurality of protrusions to the weld anvil.

16. The polymeric vessel of claim 15, wherein the weld stub has a first width and the weld anvil has a second width that is greater than the first width.

17. The polymeric vessel of claim 14, wherein the first outer surface is coplanar with the second outer surface.

18. A polymeric vessel comprising:
a first shell having a first arm defining a first outer surface, wherein the first shell is formed from a polyamide and includes a weld stub spaced apart from the first arm and having a first width of from about 3 mm to about 5 mm;
a second shell having a second arm defining a second outer surface, wherein the second shell is formed from the polyamide and includes a weld anvil spaced apart from the second arm that is matable with the weld stub and has a second width that is greater than the first width;
wherein the second width is from about 5 mm to about 7 mm;
a friction weld joint joining the weld stub and the weld anvil and extending along an entirety of the first width; and
a coupling element interconnecting the first shell and the second shell and spaced apart from the friction weld joint, wherein the coupling element includes a spring attached to and disposed between the first arm and the second arm.

19. The polymeric vessel of claim 18, wherein the first outer surface is coplanar with the second outer surface.

* * * * *